United States Patent
Frangeul et al.

(10) Patent No.: US 11,629,012 B2
(45) Date of Patent: Apr. 18, 2023

(54) CONVEYOR DEVICE

(71) Applicant: Interroll Holding AG, Sant' Antonino (CH)

(72) Inventors: Xavier Frangeul, Hückelhoven (DE); Uwe Schildheuer, Hückelhoven (DE)

(73) Assignee: Interroll Holding AG, Sant' Antonino (CH)

( * ) Notice: Subject to any disclaimer, the term of this patent is extended or adjusted under 35 U.S.C. 154(b) by 0 days.

(21) Appl. No.: 17/639,936

(22) PCT Filed: Sep. 7, 2020

(86) PCT No.: PCT/EP2020/074915
§ 371 (c)(1),
(2) Date: Mar. 3, 2022

(87) PCT Pub. No.: WO2021/048042
PCT Pub. Date: Mar. 18, 2021

(65) Prior Publication Data
US 2022/0332512 A1   Oct. 20, 2022

(30) Foreign Application Priority Data
Sep. 11, 2019 (EP) .................... 19196734

(51) Int. Cl.
*B65G 37/02* (2006.01)
*B65G 47/64* (2006.01)
*B65G 13/071* (2006.01)

(52) U.S. Cl.
CPC .......... *B65G 37/02* (2013.01); *B65G 13/071* (2013.01); *B65G 47/642* (2013.01)

(58) Field of Classification Search
CPC ...... B65G 13/06; B65G 13/071; B65G 37/02; B65G 47/64; B65G 47/642
(Continued)

(56) References Cited

U.S. PATENT DOCUMENTS 2,870,922 A * 1/1959 Thomson ............... B65G 57/06
                                                              198/414
4,508,484 A   4/1985 Heiz
(Continued)

FOREIGN PATENT DOCUMENTS

DE   102011004802 A1   8/2012
EP       0050245 A1   4/1982
(Continued)

OTHER PUBLICATIONS

FlexSim: "FlexSim User Manual 2017", Apr. 10, 2017 (Apr. 10, 2017), pp. 1520-1657, XP055709219, Retrieved from the Internet: URL: https://answers.flexsim.com/storage/attachments/6788-flexsim-1710-manual-arial.pdf [retrieved on Jun. 26, 2020]; the whole document.
(Continued)

*Primary Examiner* — Douglas A Hess
(74) *Attorney, Agent, or Firm* — Michael Soderman

(57) ABSTRACT

A conveyor device, comprising a) a plurality of rack elements arranged in a first row to define a first conveyor track. The conveyor device also comprises b) a plurality of rack elements arranged in a second row to define a second conveyor track. The conveyor device includes c) a robot unit with a traction device and a driving device, wherein said traction device is adapted to move said robot unit along said first or said second conveying direction and said driving device is adapted to engage said coupling interface of said movable carrier device to drive said movable carrier device. The conveyor device also includes d) a cross traverse rack element adapted to take up said robot unit, wherein said cross traverse rack element comprises a traverse movable load carrying device having an upper traverse load surface adapted to take up an object and a traverse coupling interface.

10 Claims, 10 Drawing Sheets

(58) Field of Classification Search
USPC .......... 198/369.7, 457.01, 457.02, 578, 619, 198/781.04
See application file for complete search history.

(56) References Cited

U.S. PATENT DOCUMENTS

| | | | |
|---|---|---|---|
| 4,512,747 | A | 4/1985 | Hitchens |
| 4,604,718 | A | 8/1986 | Norman |
| 4,811,830 | A * | 3/1989 | Felder .................... B65G 37/02 198/361 |
| 5,247,650 | A | 9/1993 | Judd |
| 5,873,449 | A * | 2/1999 | Davenport ............. B65G 37/02 198/346.2 |
| 7,077,615 | B2 * | 7/2006 | Thogersen ............. B64F 1/324 414/346 |
| 7,584,834 | B2 * | 9/2009 | Wood .................... B65G 43/10 198/581 |
| 8,156,468 | B2 | 4/2012 | Pegden |
| 9,573,765 | B2 * | 2/2017 | Becker .................. B65G 23/22 |
| 10,011,434 | B1 * | 7/2018 | Messina ............... B65G 1/0492 |
| 10,407,252 | B1 | 9/2019 | Villanueva Vargas |
| 10,766,513 | B2 * | 9/2020 | Takagawa ............ G05D 1/0238 |
| 10,773,897 | B2 * | 9/2020 | Schroader ............. B65G 47/54 |
| 11,008,169 | B2 * | 5/2021 | Dudek .................. B65G 13/06 |
| 11,040,829 | B2 * | 6/2021 | Skanse .................. B65G 13/07 |
| 2003/0065488 | A1 | 4/2003 | Beckert |
| 2009/0094574 | A1 | 4/2009 | Pegden |
| 2010/0077377 | A1 | 3/2010 | Pegden |
| 2011/0103924 | A1 | 5/2011 | Watt |
| 2013/0251480 | A1 | 9/2013 | Watt |
| 2016/0167888 | A1 | 6/2016 | Messina |
| 2018/0017964 | A1 | 1/2018 | Li |
| 2018/0162652 | A1 | 6/2018 | Rolfes |

FOREIGN PATENT DOCUMENTS

| | | | |
|---|---|---|---|
| EP | 2042449 A1 | * | 1/2009 |
| EP | 2678745 A1 | | 1/2014 |
| EP | 3401186 A1 | | 11/2018 |
| JP | H08268538 A | | 10/1996 |
| JP | 2004010289 A | | 1/2004 |
| KR | 101793932 B1 | | 11/2017 |
| WO | 2016053337 A1 | | 4/2016 |

OTHER PUBLICATIONS

Tomaas O'Hare & Associates: FlexSim Brochure, Oct. 21, 2004 (Oct. 21, 2004), XP055709201, Retrieved from the Internet: URL: http://toh.ie/wp-content/uploads/2014/12/Flexsim_Brochure_toh.pdf [retrieved on Jun. 26, 2020] The whole document.

Anonymous: "FlexSim—Wikipedia", Sep. 4, 2018 (Sep. 4, 2018), XP055709234, Retrieved from the Internet: URL: https://en.wikipedia.org/w/index.php?title=FlexSim&oldid=858077249 [retrieved on Jun. 26, 2020] The whole document.

* cited by examiner

CONVEYOR DEVICE

CROSS REFERENCE TO RELATED APPLICATIONS

This application is the U.S. national stage of International Application No. PCT/EP2020/074915, filed on 2020 Sep. 7. The international application claims the priority of EP 19196734.8 filed on 2019 Sep. 11; all applications are incorporated by reference herein in their entirety.

BACKGROUND

The invention is directed to a conveyor device and a method for configuring such a conveyor device.

Conveyor devices are used in a plurality of applications for intralogistics handling of objects. Much often, such conveyor devices are used to convey, sort and distribute objects. These objects may be placed on carriers like pallets, platforms, boxes or the like.

Generally, it is known to build up such conveyor devices from single conveyor units like e.g. conveyor belt units or conveyor roller units including a conveyor drive. In such arrangements, a high conveying capacity can be reached. The conveying directions are predefined by the placement and arrangement of the multiple conveying units connecting starting points and destination points of the conveyor device. Whilst such conveyor devices have proven to be efficient for high capacity conveying tasks in predefined conveying paths, a further, a different type of conveyer device is preferred for highly variable conveying paths and destinations with a lower capacity requirement. This different type of conveyor device employs automated guided vehicles (AGV) which are adapted to drive in a partly or fully autonomous manner in an intralogistics environment and to transport objects. Such AGV-based conveyor devices require significant safety installations if they are installed in areas where humans are working or handling the objects conveyed by the conveyor device. A further drawback of AGV-based conveyor devices is the rather small capacity compared to conveyor devices formed from stationary conveyor units with a conveyor drive like e.g. conveyor belt installations or conveyor roller installations. This low conveying capacity of AGV-based conveyor devices may be compensated to a certain extent by increasing the number of AGVs operating in the intralogistics conveyor device, but this will increase the costs and is limited by the increasing likelihood of self-hindering of the multiple AGVs due to the need for avoidance of collisions.

A first problem associated with the design and setup of conveyor devices in general lies in the configuration of such conveyor devices in such a way to meet the demands and requirements of a specific intralogistics environment. For example, the conveyor device may serve to deliver objects to be machined by a tool machine or take up objects machined by a tool machine. In such case, the conveying capacity of the conveyor device must be sufficiently high to correspond to the production capacity of the tool machine. In other applications, an input port with a predefined rate of objects delivered per time through said input port may be connected to a conveyor device. In such case, the conveying capacity of the conveyor device must be sufficiently high to take up the objects delivered via said input port and to convey these objects or distribute these objects to destinations.

SUMMARY

A conveyor device, comprising
a) a plurality of rack elements (310a-d) arranged in a first row to define a first conveyor track (310a-d), wherein said first conveyor track (310) is adapted to guide and carry an object (40, 140, 340) along a first conveying direction
b) a plurality of rack elements (320a-d) arranged in a second row to define a second conveyor track (320),
wherein said second conveyor track (320) is adapted to guide and carry an object (40, 140, 340) along a second conveying direction,
wherein said second conveyor track (320) extends in said second conveying direction and is positioned in a lateral distance to said first conveyor track (310) with respect to said second conveying direction,
wherein each rack element comprises a movable carrier device having an upper load surface (11) and a coupling interface (12),
c) a robot unit (20) with a traction device (21) and a driving device (30), wherein said traction device (21) is adapted to move said robot (20) unit along said first or said second conveying direction and said driving device (30) is adapted to engage said coupling interface (12) of said movable carrier device (10) to drive said movable carrier device (10),
d) a cross traverse rack element (350) adapted to take up said robot unit (20), wherein said cross traverse rack element (350) comprises a traverse movable load carrying device (10) having an upper traverse load surface (11) adapted to take up an object and a traverse coupling interface (12),
wherein said cross traverse rack element (350) is adapted to move in a lateral direction with respect to said second conveying direction from said first conveyor track (310) to said second conveyor track (320) and vice versa,
wherein said cross traverse rack element (350) is further adapted to couple to said first conveyor track (310) and to transfer an object (40) positioned on said traverse load surface (11) to said load surface (10) of said movable carrier device (10) of a rack element (310a-d) of said first conveyor track (310) and vice versa in a first position of said cross traverse rack element (350),
wherein in said first position said cross traverse rack element (350) is coupled to said rack element (310a-d) of said first conveyor track (310) such that said robot unit (20) may move from said cross traverse rack element (350) to said rack element (310a-d) of said first conveyor track (310) and vice versa,
wherein said cross traverse rack element (350) is further adapted to couple to said second conveyor track (320) and to transfer an object positioned on said traverse load surface (11) to said load surface (11) of said movable carrier device (10) of a rack element (320a-c) of said second conveyor track (320) and vice versa in a second position of said cross traverse rack element (350),
wherein in said second position said cross traverse element (350) is coupled to said rack element (320a-c) of said second conveyor track (320) such that said robot unit (20) may move from said cross traverse rack element (350) to said rack element (320a-c) of said second conveyor track (320) and vice versa.

DETAILED DESCRIPTION

It is a first object of the invention to provide a conveyor device having an efficient variability-to-capacity ratio compared to known conveyor devices and known AGV-based conveyor arrangements. It is a further object of the invention to allow a user to configure a conveyor device according to the actual needs of a specific conveying task in a convenient and efficient manner.

These objects are achieved according to a first aspect of the invention by a conveyor device, comprising a plurality of rack elements arranged in a first row to define a first conveyor track, wherein said first conveyor track is adapted to guide and carry an object along a first conveying direction, a plurality of rack elements arranged in a second row to define a second conveyor track, wherein said second conveyor track is adapted to guide and carry an object along a second conveying direction, wherein said second conveyor track extends in said second conveying direction and is positioned in a lateral distance to said first conveyor track with respect to said second conveying direction, wherein each rack element comprises a movable carrier device having an upper load surface and a coupling interface, a robot unit with a traction device and a driving device, wherein said traction device is adapted to move said robot unit along said first or said second conveying direction and said driving device is adapted to engage said coupling interface of said movable carrier device to drive said movable carrier device, a cross traverse rack element adapted to take up said robot unit, wherein said cross traverse rack element comprises a traverse movable load carrying device having an upper traverse load surface adapted to take up an object and a traverse coupling interface, wherein said cross traverse rack element is adapted to move in a lateral direction with respect to said second conveying direction from said first conveyor track to said second conveyor track and vice versa, wherein said cross traverse rack element is further adapted to couple to said first conveyor track and to transfer an object positioned on said traverse load surface to said load surface of said movable carrier device of a rack element of said first conveyor track and vice versa in a first position of said cross traverse rack element, wherein in said first position said cross traverse rack element is coupled to said rack element of said first conveyor track such that said robot unit may move from said cross traverse rack element to said rack element of said first conveyor track and vice versa, wherein said cross traverse rack element is further adapted to couple to said second conveyor track and to transfer an object positioned on said traverse load surface to said load surface of said movable carrier device of a rack element of said second conveyor track and vice versa in a second position of said cross traverse rack element, wherein in said second position said cross traverse element is coupled to said rack element of said second conveyor track such that said robot unit may move from said cross traverse rack element to said rack element of said second conveyor track and vice versa.

The conveyor device according to the invention comprises two conveyor tracks and it is understood that three or more conveyor tracks could be included in the conveyor device. Each conveyor track comprises a plurality of rack elements. These rack elements may be similar to each other such that a modular configuration of the conveyor device is possible. However, different rack elements may be employed to fulfill specific requirements of the conveyor track. The conveyor track may extend along a straight conveying direction or may have a curved conveying direction. The two conveyor tracks are positioned in a lateral distance to each other. This may be realized such that a rack element of the first conveyor track may be arranged in a parallel and distanced position to a rack element of the second conveyor track. Usually, this lateral distance may be understood such that an object conveyed along the first conveyor track along the first conveying direction may not be conveyed into the second conveyor track along this first conveying direction.

The rack elements are usually built up as a frame-like configuration. Each rack element comprises a movable carrier device. These movable carrier devices each have an upper load surface which is adapted and intended to support an object or a carrier for objects to be conveyed by the conveyor device. The movable carrier device may comprise a plurality of rollers, in particular rollers without a roller drive, i.e. idle rollers arranged in a substantially parallel arrangement to each other such that a straight or curved idle roller conveying track is formed by such rack element. A rack element may comprise 2, 3, 4, 5 or more such idle rollers. As an alternative, the movable carrier device may comprise an endless belt extending along the conveying direction wherein the upper surface section of such endless belt defines the upper load surface for taking up objects or carriers.

The movable carrier device further comprises a coupling interface. Such coupling interface serves to couple to a drive for driving said movable carrier device. In case that the movable carrier device comprises a plurality of idle rollers, this coupling interface may be formed by a lower section of the circumferential surface of the rollers such that a drive may couple to this lower section. Alternatively, a lateral circumferential section or a specific coupling element connected to such rollers like a sprocket wheel or a Poly-V-wheel may serve as a coupling interface. It is understood that it is preferred that the rollers of the plurality of idle rollers are not coupled to each other. Thus, one idle roller may not transfer a force or torque to another, adjacent idle roller. By this, an individual driving of each idle roller is made possible and thus a highly variable control of the conveying of objects on top of said idle rollers is achieved.

In case of an endless belt, the bottom belt section, i.e. the bottom strand of the belt may serve as a coupling surface. It is understood that preferably a plurality of endless belts arranged in a row along said conveying direction is employed in each of the conveyor tracks, wherein these endless belts are not coupled for force or torque transmission to each other such that an individual driving of each endless belt is made possible for the same reason of highly variable control of the conveying of the objects as explained beforehand.

The conveyor device further comprises a robot unit. This robot unit comprises a traction device for driving the robot unit across a floor or in a guiding arrangement like e.g. on a rail configuration comprised in the rack elements of the first and second conveyor track. This traction device is preferably driven by a traction drive comprised in the robot unit such that the robot unit may be self-propelled and moves along the conveyor tracks via this traction device. The traction device may comprise 2, 3, or 4 or more wheels or a crawler or the like.

The wheels may be arranged such that 3 or more wheels are present with each wheel being rotatable about a horizontal axis, with all said axes being offset to each other. The robot unit may be designed such that the vertical distance between the upper load surface and a bottom contact plane of the traction device is smaller than 2 meters, in particular smaller than 1.5 meter or smaller than 1 meter. By this, an efficient integration of a robot unit into a rack element with said traction device running within said rack element may be achieved. The robot unit may further have a horizontal length along its driving direction which is below 2 meters, in particular below 1.5 meter. By this, a length of said robot unit corresponds to a length of a standardized pallet and thus, a highly variable handling of such pallet is reached.

The robot unit further comprises a driving device. The driving device is adapted to couple to the movable carrier device via the coupling interface. The driving device is preferably driven by a drive unit installed on board of the robot unit such that it is propelled autonomously via this drive unit in the robot unit.

This configuration of a robot unit and the rack elements forming the conveyor tracks allows to convey objects by moving a carrier with objects or a single object along the conveyor tracks by driving the movable carrier device via the driving device of the robot unit. This conveying of objects or carriers can be synchronized with a movement of the robot unit along the conveyor track by the traction device. By this, a synchronous movement of the robot unit and the objects or carriers along the conveyor track can be accomplished and thus, an individual and variable movement using the robot unit is achieved. The robot unit itself does not carry the load of the object or carrier, but rather, this load is carried by the rack element via the movable carrier device. The robot unit, however, supplies the drive energy to move said objects or carriers along the conveyor track. As an example, in case of the movable carrier device being formed by rollers or endless belts, the traction device may move the robot unit along the conveying direction with a traction speed and the driving device may move in opposite direction to the conveying direction with a driving speed which is twice as high as the traction speed. By this, the movable carrier device like e.g. the rollers or the endless belts are driven such that the upper load surface is driven in the conveying direction with the traction speed of the robot unit such that a synchronous movement of an object placed on the upper load surface and the robot unit along the conveyor track is achieved.

It is understood that a control unit may be included in the conveyor device, in particular, as a part of and preferably comprised in the robot unit which is adapted to control the traction device and the driving device in such a way as to control such synchronous movement. It is further understood that the control unit may control different conveying situations like e.g. a movement of the robot unit along the conveyor track with a stationary upper load surface in such a way that the traction device and the driving device are driven in opposite directions at the same speed. Further, an ejecting of objects from the position above the robot unit or a gathering of objects into the position above the robot unit may be controlled such that the traction device is kept stationary and the driving device is driven.

The conveyor device further comprises a cross traverse rack element. This cross traverse rack element is different from the rack elements forming the first and the second conveyor track. The cross traverse rack element serves to connect the first and the second conveyor track and thus is configured to perform a movement in the lateral direction with respect to the conveying direction along the first or the second conveyor track. The robot unit may connect, or in any other way be positioned at the cross traverse rack element such that a synchronous movement of the cross traverse rack element and the robot unit takes place. This can e.g. be achieved in that the cross traverse rack element comprises traction surfaces like rails which can be engaged by the traction device of the robot unit. Such rails may be formed such that a continuous traction platform for the traction device of the robot unit is established if the cross traverse rack element couples to a rack element having rails for the robot unit as well.

The cross traverse rack element further comprises a traverse movable load carrying device. This traverse movable load carrying device may be somewhat similar or even identical to the movable load carrying device of the rack elements. This traverse movable load carrying device comprises a traverse load surface and a traverse coupling interface which may be close to similar or even identical with the load surface and the coupling interface of the rack elements. By this, an object or carrier can be supported by the cross traverse rack element and can be conveyed by corresponding interaction with a robot unit driving said traverse movable load carrying device with its driving device via the traverse coupling interface. Generally, the robot unit and an object or carrier may be moved in a lateral direction together and simultaneously by the cross traverse rack element performing such lateral movement. By this, both the robot unit and an object or carrier can be transported from the first to the second conveyor track or vice versa.

The cross traverse rack element is adapted to couple to the first conveyor track in a first position and to couple to the second conveyor track in a second position such that the robot unit may release the connection to the cross traverse rack element after such coupling was established, leave the cross traverse rack element and may move along the first or the second conveyor track, respectively. Further, this coupling may allow to convey an object or carrier from the cross traverse rack element to the first conveyor track and the second conveyor track, respectively. Thus, generally, it is possible to convey an object or carrier along the first conveyor track by the robot unit, position this object or carrier at the cross traverse rack element simultaneously with the robot unit and then move the object or carrier together with the robot unit to the second conveyor track and hereafter to convey the object by the robot unit along the second conveyor track. This option opens a highly variable conveying action with a significant capacity at low investment costs.

According to a first preferred embodiment
- said cross traverse rack element is adapted to be coupled to said robot unit such that said traction device of said robot unit effects said lateral movement of said cross traverse rack element, or
- said cross traverse rack element comprises a traverse traction device with a traverse traction coupling interface adapted to couple to said traction device or said driving device of said robot unit when said robot unit taken up by said cross traverse rack element such that a driving force transmitted via said traverse traction coupling interface from said robot unit to said traverse traction device drives the lateral movement of the cross traverse rack element with said robot unit taken up, or
- wherein said cross traverse rack element comprises a cross traverse traction device for effecting said lateral movement of said cross traverse rack element.

According to this embodiment, the traction device of the robot unit may effect the traverse movement of the cross traverse rack element with the robot unit being fixed at the cross traverse rack element. In such embodiment, the traction device will directly contact the floor and hereby propel the coupled unit of the robot unit and the cross traverse rack element. The robot may therefore be taken up in the cross traverse rack element and be rotated or otherwise changed in its orientation, if this is required, by a respective coupling interface between the robot unit and the cross traverse rack element.

According to an alternative embodiment, a traverse traction device may be provided at the cross traverse rack element. This traverse traction device allows to be coupled to either the traction device or the driving device of the robot unit. By this, a force or torque can be transmitted from said traction device or driving device to the traverse traction device to effect the movement of the cross traverse rack element in the traverse direction. By this, the movement of the cross traverse rack element is driven by the robot unit, in particular, by coupling to one of the drives installed in the robot unit to drive the traction device or the driving device. The traverse traction coupling interface could be adapted to be releasable to allow a movement of the robot unit in relation to the cross traverse rack element in a released state and to allow the robot unit to be stationary within the cross traverse rack element and to drive the traverse movement in a coupled state of said traverse traction coupling interface. It is understood that as a general alternative to this embodiment, the cross traverse rack element may comprise a cross traverse traction drive to directly drive said traverse traction device and to hereby provide an autonomous movement of the traverse traction device with or without the robot unit.

Still further, the cross traverse rack element may comprise an own drive unit effecting the lateral movement. This may e.g. be a driven wheel or crawler track mounted to the cross traverse rack element.

According to a further preferred embodiment, said traverse coupling interface is adapted to couple to said driving device of said robot unit and wherein a force transferred via said traverse coupling interface from said driving device to said traverse movable carrier device conveys an object positioned on said traverse load carrying surface. According to this embodiment, the traverse coupling interface allows driving of the traverse movable carrier device by the driving device of the robot unit. This coupling between the driving device and the traverse movable carrier device may be designed and accomplished in a similar or identical way as the coupling of the driving device to the coupling interface of the movable carrier device in one of said conveyor tracks. By this coupling, an object or a carrier can be conveyed to or from said cross traverse rack element. In particular, the cross traverse rack element may be integrated into a conveyor track formed from rack elements and objects or carriers may be conveyed along said conveyor track including said cross traverse rack element at an end position or in an intermediate position in said conveyor track.

It is further preferred that said movable carrier device and/or said traverse movable carrier device comprises a plurality of idle rollers, wherein a first surface section, in particular a top circumferential surface section or a first axial circumferential surface of the idle rollers define the load carrying surface and the traverse load carrying surface, respectively, wherein a second surface section, in particular a bottom circumferential surface section or a second axial circumferential surface section of the idle rollers define the coupling interface and the traverse coupling interface, respectively. According to this embodiment, the movable carrier device comprises idle rollers, i.e. rollers which have no integral drive unit. Such idle rollers may comprise a cylindrical or conical roller body wherein the circumferential surface of such roller body defines both the load carrying surface and the coupling interface such that either a circumferential section or an axial section of this circumferential surface defines these functional surfaces/interfaces for carrying an object or a carrier and for coupling to the driving device of the robot unit. It is understood that the first and second surface section is defined as an angle section wherein the frictional or form-locking contact to an object or a carrier and to the driving device, respectively is established. In the course of driving the movable carrier device, the whole circumferential surface of the idle rollers will be engaged in such load transmission and drive transmission, but, however, this engagement will take place in the particular, fixed angle only.

According to a further preferred embodiment at least one of the first and the second conveyor track comprises a coupling end or a gap between two rack elements forming said first and second conveyor track, respectively, said gap being dimensioned to take up said cross traverse rack element in said first and said second position, respectively. It is understood that the cross traverse rack element may be positioned at the beginning or the end of the first or the second conveyor track to effect the moving of objects or carriers and of the robot unit out of the cross traverse rack element to the first or second conveyor track or to take up objects or carriers and the robot unit out of one of these conveyor tracks. In a particular embodiment, however, a gap between two rack elements is provided which is dimensioned such that the cross traverse rack element may fill this gap to complete the first conveyor track or the second conveyor track, respectively. By this, an efficient conveying of objects or carriers from any position at the first conveyor track to any position of the second conveyor track can be reached, and vice versa. In particular, it is not required to drive the robot unit together with the object or carrier to one end of the first or second conveyor track to allow a traverse movement of said object/carrier and said robot unit.

According to a further aspect of the invention, the object is solved by a method for configuring a conveyor device, in particular a conveyor device as described beforehand, comprising the steps:

a) providing a list of predetermined virtual modules on a graphical user interface, wherein said list comprises at least three different virtual modules, and wherein said list contains at least one virtual conveyor module which is associated to a first conveying parameter characterizing a conveying capacity of a conveyor module represented by said virtual conveyor module, at least one virtual start module representing a first station capable to input objects into the conveyor device, at least one virtual end module which is associated to a second conveying parameter characterizing an output capacity of a second station represented by said virtual end module to output objects from the conveyor device, said list of predetermined virtual modules and said at least one parameter being stored in an electronic storage, b) providing a graphical user interface field, wherein a user may place a plurality of virtual modules selected from said list of predetermined virtual modules to configure a virtual setup representing a conveyor setup of a conveyor device, c) calculating in a simulation mode based on said first and second conveying parameter and said virtual setup a conveying operation of a conveyor device represented by said virtual setup, d) calculating from said conveying operation whether said conveyor device has a sufficient conveying capacity such that it is capable of conveying sufficient objects from said first station to said second station such that a number of objects is conveyed to said second station per time such that said number is equal or higher than the capacity of the second station to output objects from the conveyor device, e) outputting a signal via a user interface characterizing whether the calculation performed in step d) revealed that the conveyor setup represented by said virtual setup has a sufficient conveying capacity to fulfill the capacity of the second station.

According to this aspect of the invention, a modular conveying device is provided and a method for efficiently configuring this conveying device allows the user to predict an efficient use and a sufficient capacity of the conveying device as configured. This prediction is achieved according to the invention by first defining the setup of the conveyor device in a layout process and hereafter calculating a simulation of the conveying process and the conveyor capacity based on the data derived from this layout process.

According to a preferred embodiment step b) may comprise loading geometrical data describing geometrical boundaries and potential built in components of a space where the conveyor device is to be installed and displaying said boundaries and components to the user in the graphical user interface field. For example, a DXF/DWG data file may be provided to define such boundaries and components.

In the layout process, a user may select from predefined virtual modules those modules which shall be used to configure and design the conveyor device. The user may select single virtual modules or multiple identical virtual modules and arrange these modules in a virtual field in such an arrangement as intended to be realized in the conveyor device in the real application. The provision of the list of these predetermined virtual modules and the virtual field wherein the setup of the conveyor device is virtually built up is conducted via a graphical user interface like a screen of a computer, an electronic hand-held device with touchscreen or the like. Each virtual module has associated parameters characterizing the conveying characteristics of such module. As an example, such parameter may include a conveying rate or a conveying speed, a length of the conveyor module or any further parameters relevant to calculate a conveying capacity of this module. The user may further select virtual modules representing a robot unit which is effecting the conveying action by driving the objects or carriers.

After the user has made the definition of the conveyor device in the virtual setup on the graphical user interface, a plausibility check may be conducted pointing out to non-functional connections between conveyor modules in the virtual setup or the like.

The virtual setup further comprises a virtual start module and a virtual end module. It is understood that these modules may be positioned anywhere in the configuration of the conveyor device and the virtual setup, respectively. Depending on the task to be performed by the conveyor device, the start module and the end module represent incoming or outgoing objects or carriers and at least one of the start module or the end module defines a rate of incoming or outgoing objects or carriers. This rate may be defined as a number of incoming objects or carriers per time unit, a weight of incoming or outgoing objects or carriers per time unit, a geometrical dimension like a sum of lengths of incoming or outgoing objects or carriers per time unit or any other parameters characterizing a rate of incoming or outgoing objects or carriers relevant to calculate a conveyor capacity for these objects/carriers. In particular, both the start module and the end module may be characterized by such a parameter, since this represents a typical conveyor task and condition, wherein a first specified rate of incoming objects or carriers is to be conveyed to a second specified, different rate of outgoing objects and carriers at an end point.

Based on the such defined conveyor device defined by the virtual modules arranged in the layout process according to the steps a) and b) of the method, a simulation is performed by an electronic processor, wherein the arrangement of the modules and the parameters characterizing the conveying capacity of each module is simulated based on the incoming or outgoing rate as predefined in the layout process. This calculation, according to steps c) and d) of the method, reveals whether the configuration of the conveyor device provides a sufficient capacity to fulfill the needs at the start point or the end point. A respective signal is output via a user interface characterizing the result of the simulation process of steps c) and d). This signal may be a simple binary signal showing the user whether the requirements of capacity are fulfilled or not. The signal, however, may be a sophisticated signal marking a module which represents a bottle neck in the overall capacity of the conveyor device or proposing changes or improvements to the layout of the modules which would increase the capacity. As an example, the signal output to the user may signalize that a second robot unit should be installed in the conveyor device to fulfill the capacity needs of the start module or the end module. Further, a shortening of conveyor tracks to allow the robot unit to convey objects and carriers along a shorter path from the start module to the end module could be reflected by the signal. Still further, if a bottle neck position significantly reducing the capacity is identified, this could be highlighted by the signal and/or a parallel conveyor track to increase the capacity at this position could be proposed via the signal.

According to an alternative to this aspect of the invention, the object underlying the invention is solved by a method for configuring a conveyor device, comprising the steps:

a) providing a list of predetermined virtual modules on a graphical user interface, wherein said list comprises at least three different virtual modules, and wherein said list contains at least one virtual conveyor module which is associated to a first conveying parameter characterizing a conveying capacity of a conveyor module represented by said virtual conveyor module, at least one virtual start module which is associated to a third conveying parameter characterizing an input capacity of a first station represented by said virtual start module to input objects into the conveyor device, at least one virtual end module representing a second station capable to output objects from the conveyor device, said list of predetermined virtual modules and said at least one parameter being stored in an electronic storage, b) providing a graphical user interface field, wherein a user may place a plurality of virtual modules selected from said list of predetermined virtual modules to configure a virtual setup representing a conveyor setup of a conveyor device, c) calculating in a simulation mode based on said first and third conveying parameter and said virtual setup a conveying operation of a conveyor device represented by said virtual setup, d) calculating from said conveying operation whether said conveyor device has a sufficient conveying capacity such that it is capable of conveying all objects input into the conveyor device from said first station into the conveyor device to said second station, e) outputting a signal via a user interface said signal characterizing whether the calculation performed in step d) revealed that the conveyor setup represented by said virtual setup has a sufficient conveying capacity to fulfill the capacity of the first station.

This alternative to the aforementioned aspect of the invention is based on a predefined capacity at a start module of the conveyor where objects or carriers are input into the conveyor device at a certain rate. In this method, the layout process and the calculation of the capacity in the simulation is basically conducted in the same way as in the first alternative, but whilst in the first alternative, the signal output to the user signalizes, whether a sufficient conveying capacity is present to convey objects or carriers from a start position to an end position to fulfill a certain rate of objects expelled at this end position, in the second alternative, the signal signalizes, whether the conveying capacity is sufficient to convey objects input into the conveyor device at a start position with a certain rate to an end position. Thus, whilst it is assumed in the first alternative that the start position may provide objects in any rate sufficient to fulfill the needs and the rate at the end position, the second alternative calculates the signal based on the assumption that the end position is capable of outputting objects at any rate sufficient to fulfill the needs and the rate of the start position inputting the objects at a predefined rate. In both alternatives, however, a layout of the conveyor device in a virtual space forms the basis for conducting the simulation and the simulation calculates the conveying capacity of the conveyor device represented by the virtual setup from the start position to the end position.

In both alternative embodiments, it is preferred that in said calculating step c) a load capacity of a carrier and a moving speed of a conveyor drive is comprised in said first conveying parameter and a conveying distance between said first station and said second station is derived from said virtual setup and wherein in said calculating step d) said load capacity and said moving speed is multiplied with each other and divided by said conveying distance to calculate a delivery rate of said conveyor device, wherein said delivery rate is compared to said input or output capacity of said first station or said second station, respectively. According to this preferred embodiment, the calculating steps c) and d) consider the length of the conveying path defined by the virtual setup between the first and the second station, the number of objects to be conveyed simultaneously and the conveying speed of these objects. Based on these parameters, it then can be calculated and compared, whether the conveying capacity is equal or higher than the input capacity or output capacity, respectively. It is understood that the load capacity and moving speed may be defined for each single conveyor module involved in the conveyor path between the first and the second station and in the simulation according to calculating step c), the single capacities of each such conveyor module may be calculated and an integral calculation along the whole conveying path may be performed to determine the conveying capacity.

According to a further preferred embodiment, said conveyor module represented by said virtual conveyor module is a rack element adapted to carry and guide an object and further adapted to couple to a robot unit, wherein said list further comprises a second virtual conveyor module representing said robot unit and wherein a conveyor parameter is associated to said second conveyor module characterizing a translational moving speed of said robot unit along said rack element and wherein in said calculating step c) the length of a conveying distance from said first station to said second station is calculated from an arrangement of a plurality of said virtual conveyor modules representing said rack elements and forming said virtual setup and a travel distance of said robot unit along said virtual setup between said first station and said second station is calculated based on said moving speed. According to this embodiment, the conveyor device represented by the setup of virtual conveyor modules is composed of rack elements configured as guiding and carrying units which may correspond to the rack elements discussed beforehand, which serve to carry an object or a carrier to be conveyed and which further serve to guide said object or carrier and further guide a robot unit. This specific arrangement allows a variable and flexible setup of conveyor devices using rack elements which can be positioned adjacent to each other to form a conveyor track. A robot unit serves to convey objects or carriers along such conveyor track by conducting a simultaneous movement of the robot unit with said object or carrier along said conveyor track. In this aspect, the robot unit is represented by a second virtual conveyor module, thus allowing a user to select one, two or more such robot units to be present in the conveyor device and to thus define an important parameter for calculating the conveying capacity. It is understood that the setup of the conveyor device represented by the conveyor modules according to this embodiment may correspond to the configuration of the conveyor device explained beforehand and that any relevant geometrical or functional parameters involved in such configuration may be represented by conveyor parameters associated to the virtual conveyor modules used by the user to virtually define the conveyor device.

It is further preferred that a cross traverse rack element adapted to take up said robot unit is represented by a third virtual conveyor module configured to conduct a cross traverse oriented in an inclined direction to said translational movement of said robot unit, wherein a cross traverse travel speed is contained in a conveyor parameter associated to said third virtual conveyor module, wherein said virtual setup comprises a first conveyor line and a second conveyor line arranged in a distance to said first conveyor line each of said first and second conveyor line comprising a plurality of said virtual conveyor modules and a third virtual conveyor module connecting said first and said second conveyor line, wherein said first station is positioned at said first conveyor line and said second station is positioned at said second conveyor line and wherein in said calculating step c) a cross travel distance is calculated based on said virtual setup as a distance traveled by said cross traverse rack element to move said robot unit from said first conveyor line to said second conveyor line and wherein a travel time calculated from said cross travel distance and said cross travel speed is considered in said calculating step d)

According to this further preferred embodiment of the method, the virtual setup of the conveyor device comprises a cross traverse rack element as explained beforehand to the first aspect of the invention and said cross traverse rack element is represented by a third virtual conveyor module and conveyor parameters characterizing the relevant characteristics of this cross traverse rack element for calculating the conveying capacity. By this, a variable and complex architecture of a conveyor device can be configured and represented in a virtual setup and the conveying capacity between a first station and a second station can be calculated including and implementing single and local parameters and distances of different conveyor modules involved in the conveying path between said first and second station. It is understood that the geometrical characteristics and functional properties of said cross traverse rack element may be identical to those of the cross traverse rack element explained beforehand.

According to a further preferred embodiment said list of predetermined virtual modules comprises a virtual tool machine module representing a tool machine, wherein a conveying parameter associated to said virtual tool machine module defines a virtual safety fence representing a safety fence around said tool machine, wherein said conveyor module represented by said virtual conveyor module is a rack element adapted to carry and guide an object and further adapted to couple to a robot unit, wherein said list further comprises a second virtual conveyor module representing said robot unit and wherein a conveyor parameter is associated to said second conveyor module characterizing a translational moving speed of said robot unit along said rack element and wherein in said calculating step c) the length of a conveying distance from said first station to said second station is calculated from an arrangement of a plurality of said virtual conveyor modules representing said guiding and carrying units and forming said virtual setup and a travel distance of said robot unit along said virtual setup between said first station and said second station is calculated based on said moving speed, wherein in said calculating step c) said robot unit is calculated to pass through said safety fence represented by said virtual safety fence.

According to this embodiment and aspect of the invention, a tool machine is included in the setup supplied by the conveyor device. Such tool machine may form the start module or the end module, i.e. first station or the second station, in that objects machined by said tool machine are input into the conveyor device or objects to be machined by the tool machine are to be output from the conveyor device with a sufficient conveying capacity. The tool machine is guarded by a fence which safeguards a region or sector around the tool machine from being entered by a human being. This fence is represented by a virtual safety fence defined as a conveying parameter. In this embodiment, the conveyor device is capable of conveying objects to and from the tool machine, i.e. crossing the fence. However, this crossing of the fence is considered as a conveying parameter in that it may change the conveying capacity. As a first example, the conveyor speed may be faster inside the safeguarded region or sector than outside the fence, since safety requirements outside the fence must consider human beings being present, whilst this is not to be considered inside the safeguarded region/sector. Further, crossing of the fence may temporarily reduce the conveying speed in the region of the fence. Still further, any human interaction related to the conveying capacity like e.g., a loading or unloading of carriers on the rack elements may happen outside the safeguarded region/sector only, but not inside. These aspects influencing the conveying capacity may be represented by the position of the fence in the virtual setup and the conveying parameter associated to said virtual tool machine. As a specific matter, the robot unit is adapted to cross the fence, i.e. to conduct a conveying action inside the safeguarded region/sector and outside. By this, the conveying speed may generally be increased in that no different conveyor devices are required to transport objects or carriers into such safeguarded region or out of such safeguarded region. According to the invention, this specific setup of a conveyor device is considered in the layout of a conveyor device and the simulation of the conveying capacity of such configured conveyor device according to the virtual layout.

As a further aspect of the invention, the object is solved by a conveyor arrangement, comprising a plurality of rack elements extending along a conveying direction, each of said rack element s comprising a movable load carrying surface defined by a movable carrier device, a second conveyor module configured as a robot unit, wherein said robot unit comprises a traction device for driving said drive robot unit along said rack element in said conveying direction and a driving device adapted to couple with said movable carrier device and to drive said movable carrier device, wherein said coupling of said driving device to said movable carrier device enables said driving device to move said movable load carrying surface, at least one tool machine representing a first station capable to input objects into the conveyor device, a fence circumscribing a safeguarded zone wherein said tool machine is positioned within said safeguarded zone, further comprising a human work zone adjacent to said safeguarded zone and separated from said safeguarded zone by said fence, wherein said rack elements define a conveying track extending from said human work zone through said fence into said safeguarded zone, wherein said robot unit is adapted to drive in said rack elements from said human work zone into said safeguarded zone and vice versa.

According to this embodiment, the conveyor device and the virtual setup of such conveyor device as explained beforehand in relation to the layout and simulation of the conveying capacity is embodied in a conveyor arrangement comprising corresponding rack elements, at least one robot unit and at least one tool machine being safeguarded by a fence. The robot unit is adapted to convey objects to the tool machine through the safeguarding fence and/or to convey objects from said tool machine through said safeguarding fence into a human work zone. By this, an efficient conveying of such objects to and from a safeguarded tool machine is achieved with, at the same time, a simple option to conduct human work at those objects outside the safeguarding region around the tool machine.

It is further preferred that said robot unit has a front end and a rear end, with at least one front time-of-flight sensor being positioned at said front end and preferably at least one rear time-of-flight sensor being positioned at said rear end, further comprising a control unit coupled to said front time-of-flight sensor for receiving a sensor signal with said control unit being adapted to interpret said sensor signal to identify an obstacle in the conveying direction and to control said traction device to stop if an obstacle is identified in a driving mode.

According to this embodiment, the robot unit is equipped with at least one time-of-flight sensor (ToF-sensor) at the front end. It is understood that the robot unit may comprise more than one time-of-flight sensor, e.g. a further time-of-flight sensor at the rear end or a plurality of time-of-flight sensors. Time-of-flight sensors are understood as sensors sending out a signal and receiving this signal after it has been reflected from a surface on its path. The sensors are adapted to calculate the time elapsed between said sending out and receiving of the signal and to calculate therefrom the distance to the surface which reflected the signal. By this, time-of-flight sensors allow to picture an environment surrounding the robot unit at cheap costs in real time. The time-of-flight sensor of the robot unit is employed to identify obstacles in the conveying direction. By this, a control unit adapted to receive the signal of the time-of-flight sensor is able to control the movement of the robot unit such that a collision with such an obstacle identified by the ToF-sensor is avoided. Usually, such avoidance of a collision may be realized by stopping the traction device of the robot unit. By this, a safe driving of the robot unit is achieved.

It is further preferred that said control unit is adapted to interpret said sensor signal to identify an object on top of said movable carrier device and to control said traction device to position said robot unit below said object. According to this embodiment, the ToF-sensor is further employed to identify an object on top of the movable carrier device. Such object is not an obstacle in the conveying direction, since the robot unit cannot collide with such an object, but rather may pass below such object. However, the ToF-sensor is employed to identify the object and to position the robot unit right below said object. Such function and interaction of the ToF-sensor and the control unit with the traction device is required to allow said robot unit to couple the driving device to the movable carrier device right below said object to hereafter conduct a conveying action with a synchronous movement of the robot unit and the object with said driving device being coupled to said movable carrier device.

The ToF-sensors may also be used to detect a human or an object standing next to the conveyor. When detecting a human or object next to the conveyor, the control unit may be adapted to activate an acoustical or optical signal like flashing lights on the ground and may slowdown the moving speed to both limit energy in case of collision between transported load and human/object leaning above conveying surface and to reduce stopping distance in case of intrusion of human/object into the robot channel.

A further aspect of the invention is a method of handling an object and machining said object in a tool machine, comprising the steps of:
conveying said object along a plurality of rack elements extending along a conveying direction, said rack elements extending from said human work zone into a tool machine zone separated from said human work zone by a fence, each of said rack elements comprising a movable load carrying surface defined by a movable carrier device, wherein a robot unit comprising a traction device and a driving device is driven by said traction device along said rack element and wherein said driving device couples with said movable carrier device and drives said movable carrier device, wherein said object is positioned on top of said movable carrier device, wherein said object is handled by a human in said human work zone by a human, and is moved along said rack elements on top of said movable carrier device synchronously with said robot unit with said driving device being coupled to said movable carrier device from said human work zone into said tool machine zone for machining said object by said tool machine, or wherein said object is machined by said tool machine in said tool machine zone and is moved along said rack elements on top of said movable carrier device synchronously with said robot unit with said driving device being coupled to said movable carrier device from said tool machine zone into said human work zone and is handled by a human in said human work zone.

It is preferred that the method further comprises the steps of conveying said object along a plurality of rack elements extending along a conveying direction of a first conveyor track by said robot unit with said driving device being coupled to said movable carrier device, transporting said robot unit and said object by a cross traverse rack element to a second conveyor track, conveying said object along a plurality of rack elements extending along a conveying direction of said second conveyor track by said robot unit with said driving device being coupled to said movable carrier device.

According to this method and the preferred embodiment of the method, an object is handled by a human being in a human work zone and conveyed by a robot unit out of that human work zone into a safeguarded zone. This conveying may take place in a conveying along a conveying direction and a cross traverse conveying in a lateral direction with respect to said conveying direction. By this, a flexible conveying action with a fast passing between a safeguarded zone and a human work zone is achieved and a safe working of a human being at objects being conveyed into and out of said safeguarded zone is reached.

BRIEF DESCRIPTION OF THE DRAWINGS

Preferred embodiments of the invention are explained with reference to the figures. In the figures.

DETAILED DESCRIPTION OF THE PREFERRED EMBODIMENTS

Figure 1A:
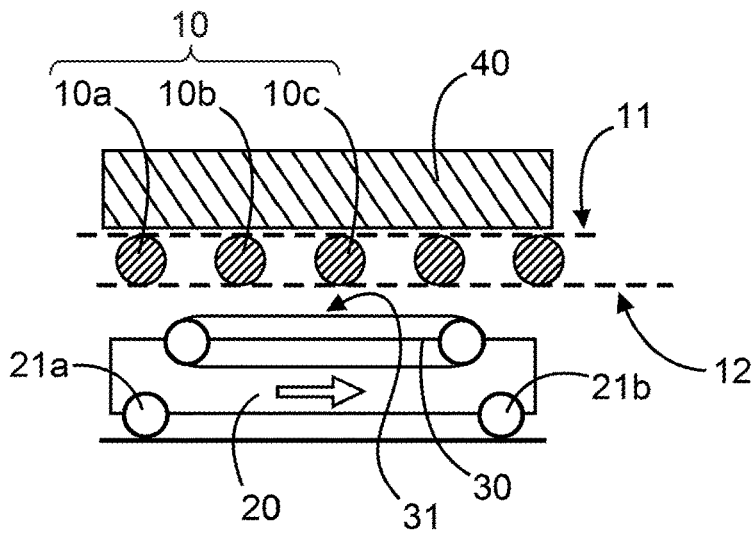
FIGS. 1A-C show a schematic side view of a part of a conveyor device according to the invention in three different operation modes.
Figure 1B:
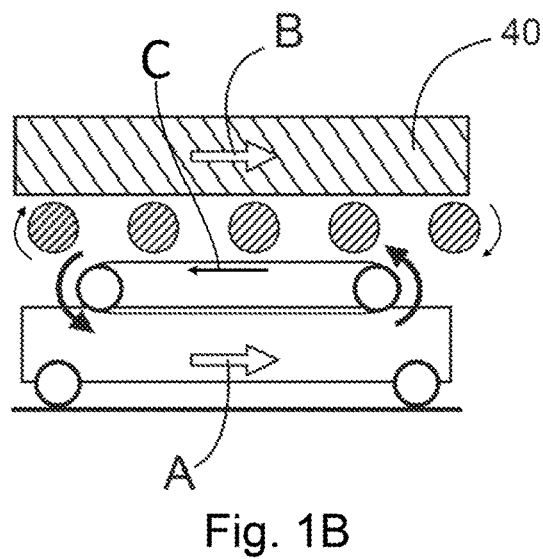
Figure 1C:
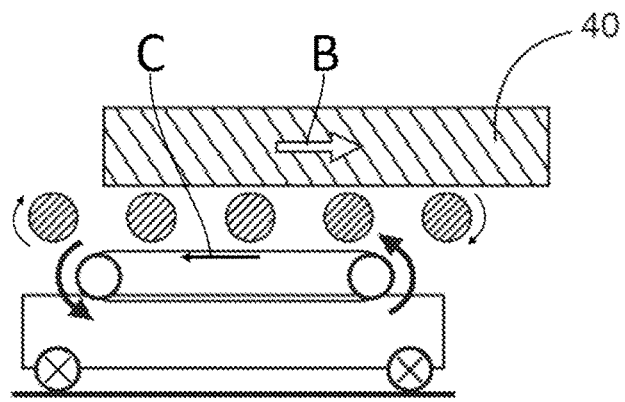

Making reference first to FIGS. 1A-C, a roller track comprising a plurality of idle rollers 10a, b, c . . . having a cylindrical body which is rotatable about a horizontal axis and are shown in the side view. These rollers are arranged side-by-side along a horizontal plane and thus define a load carrying surface on top of the rollers by a circumferential section of the roller bodies.

In the same way, a bottom surface section of the rollers define a coupling interface adapted to couple to a driving device of a robot unit. Thus, the plurality of rollers 10a-c form a movable carrier device 10 with a load carrying surface 11 and a coupling interface 12.

A robot unit 20 is positioned below the rollers 10a-c. This robot unit 20 comprises a traction device 21 having four wheels 21a, b at the four corners of the robot unit 20. The traction device 21 is in contact to a tractive surface which may be integral to a track element comprising the roller track and which is adapted to transfer a horizontal traction force. With the traction device 21a, b, the robot unit 20 is capable of moving on the tractive surface (e.g. a floor or a rail configuration) in a conveying direction and vice versa.

The robot unit further comprises a driving device 30. The driving device 30 comprises in particular a belt drive with a horizontal upper belt plane 31 on top of the robot unit 20. The whole belt drive can be lifted upwards to establish an engagement of the belt drive with its upper belt surface 31 to the coupling interface 12 of the movable carrier device.

FIG. 1A shows a first operating mode wherein the robot unit 20 is driven by the traction device 21*a, b* in a horizontal direction. The driving device is not coupled to the coupling interface of the movable carrier device and thus, an object 40 placed on top of the movable carrier device 10, formed by the rollers 10*a-c*, is kept stationary.

FIG. 1B shows a second mode of operation. In this second mode of operation, the robot unit 20 moves in a conveying direction A at a traction speed driven by the traction device 21*a, b*. The driving device 30 is coupled to the movable carrier device 10 and is driven with a driving speed twice as high as the traction speed in a direction, wherein the top belt surface 31 moves in opposite direction C to the conveying direction A. The idle rollers 10*a-c* are thus driven in a clockwise direction with a circumferential speed equal to the traction speed in conveying direction A. Thus, a conveying speed in the same direction as the traction direction A is produced at the load carrying surface 11 and the object 40 is conveyed in a direction B with a conveying speed corresponding to the traction speed of the robot unit. In this second operating mode, the robot unit 20 and the object 40 to be conveyed move synchronously along the movable carrier device 10 at traction speed.

It is understood that the first operating mode could be established with a lifted driving device 30 for keeping the object 40 stationary by driving the belt drive 30 in opposite direction with respect to the top belt surface 31 at the same driving speed as the traction speed A. In such case, the idle rollers 10*a-c* will be kept in a non-rotating state and thus, the object 40 will be kept stationary. In particular, by such way of control, the lifting device could be omitted and the driving device could permanently be kept in contact with the coupling interface.

FIG. 1C shows a third operating mode wherein the traction device 21*a, b* is stationary and thus, the robot unit 20 does not move. The driving device 30 is lifted and coupled to the coupling interface 12 and is driven in a counter-clockwise direction as in the second operating mode shown in FIG. 1B. In this third operating mode, the object 40 is thus conveyed out of the position above the robot unit and thus expelled from this position. It is understood that this expelling mode could alternatively be driven as a gathering mode with a control of the movement of the driving device such that an object, which is not positioned above the robot unit, is drawn into a position above the robot unit.

In the specific setup shown according to the principle of FIGS. 1A-C, it is important to note that the robot unit 20 itself does not carry a weight load of the object 40 and thus neither needs to be dimensioned such that this weight could be carried nor needs to have any specific stops, frames or the like to take up such an object in a safe condition. Instead, the robot unit 20 couples for transmitting a driving force to a movable carrier device 10 which carries the weight load of the object 40. The robot unit 120 itself thus only needs to be adapted to establish a safe coupling to the coupling interface of the movable carrier device and hereafter transfers a driving force to the movable carrier device, which itself does not include a drive.

Figure 2:
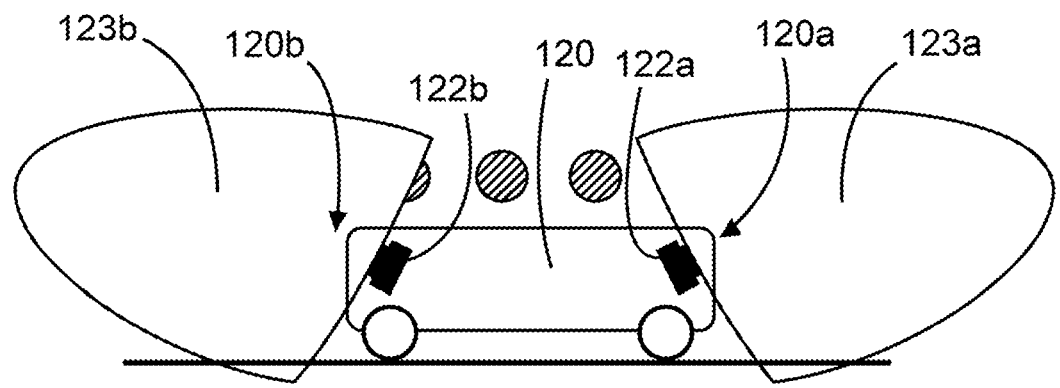
FIG. 2 shows a schematic view of a robot unit according to the invention with a schematic representation of the sensor detecting field.

FIG. 2 shows a robot unit 120 in main similar to the robot unit sown in FIG. 1, having a front end 120*a* and a rear end 120*b*. As can be seen, time-of-flight sensors 122*a, b*, are positioned at the front end and the rear end, respectively. The time-of-flight sensors 122*a, b*, surveil a sensor range sector 123*a, b* which covers a space in driving direction before and behind the robot unit and a space above the movable carrier device formed by the idle rollers 10*a, b, c*, similar to the movable carrier device 10 as shown in FIG. 1.

Figure 3:
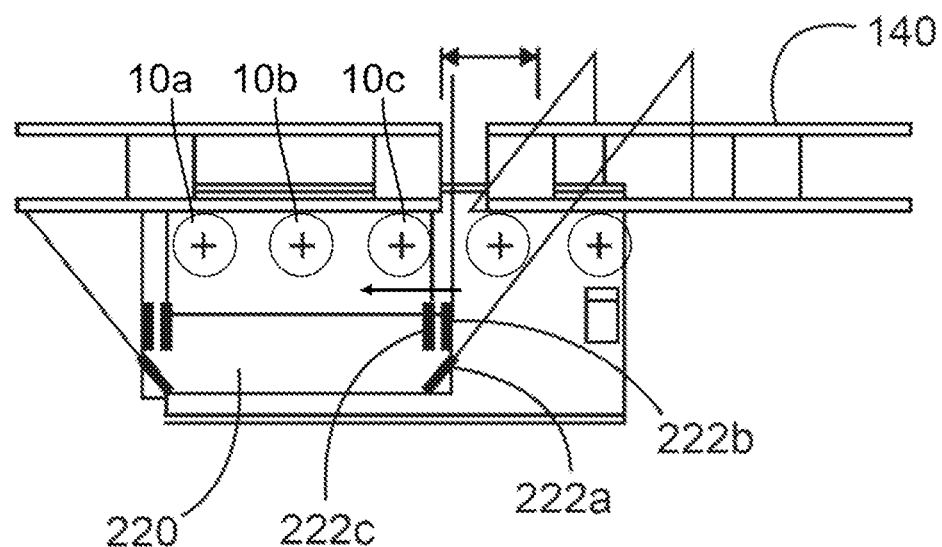
FIG. 3 shows a schematic side view of a part of a conveyor device in a sensor detection operating mode.

FIG. 3 shows a first mode of operation of the ToF-sensors. In this first mode, the ToF-sensors are employed to detect a carrier 140 represented by a pallet on top of the movable carrier device. As can be seen, a first, inclined ToF-sensor 222*a* is oriented in such an angle as to have a line of sight reaching through the gap between two adjacent idle rollers of the movable carrier device. Further, two ToF-sensors 222*b, c*, are positioned at the same end as the inclined ToF-sensor 122*a* and have a line of sight which is oriented vertically. Thus, two adjacent line of sights, which are parallel and in a distance to each other in the conveying direction monitor the space above the movable carrier device. The sensor signals of the three ToF-sensors 222*a-c* are received by a control unit which may be placed on board of the robot unit or may be transferred via a data connection to a control unit, which could be a stationary unit. By analyzing these sensor signals, a pallet positioned on top of the movable carrier device can be detected and further, the front end or the rear end of such pallet can be detected with respect to its position. By this, an exact positioning of the robot unit below such pallet can be controlled by driving the traction device correspondingly. Instead of a pallet any other object to be conveyed can be used here.

Figure 4:
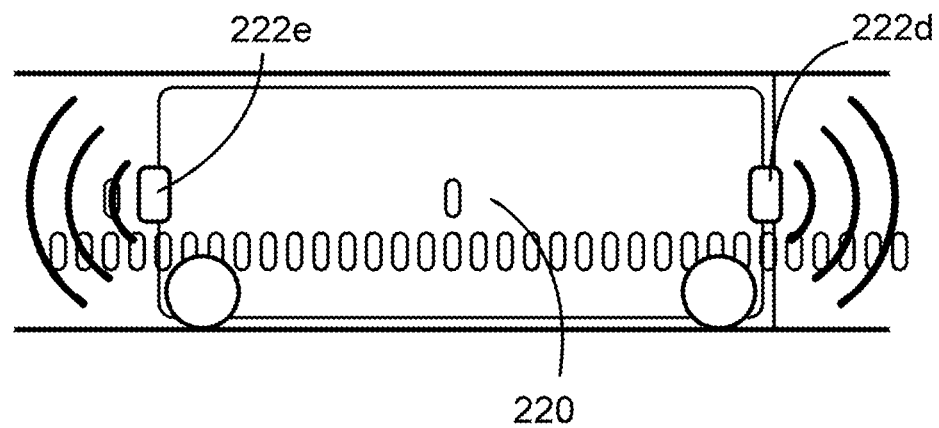
FIG. 4 shows a schematic side view of a part of a conveyor device in a further sensor detecting operating mode.

FIG. 4 shows a second mode of operation, wherein a time-of-flight sensor 222*b* is positioned at the front end of the robot unit and a further time-of-flight sensor 222*e* is positioned at the rear end of the robot unit 220. In this mode of operation, the ToF-sensors 222*b, e*, have horizontal line of sight and thus may detect any obstacles in front of the robot unit or behind the robot unit 220. Thus, obstacles can be detected in any horizontal driving direction of the robot unit and the traction device can be stopped correspondingly to avoid a collision with such obstacles.

At least one, preferably two additional TOF-sensors at the front and the rear end are provided and dedicated to check the presence of the rollers above the robot unit. The signal of these ToF-sensors is processed by the control unit to ensure that no goods are conveyed if the structure is not stable, e.g. if the roller track ends or a gap is present in the roller track. This will ensure a high safety level.

Figure 5:
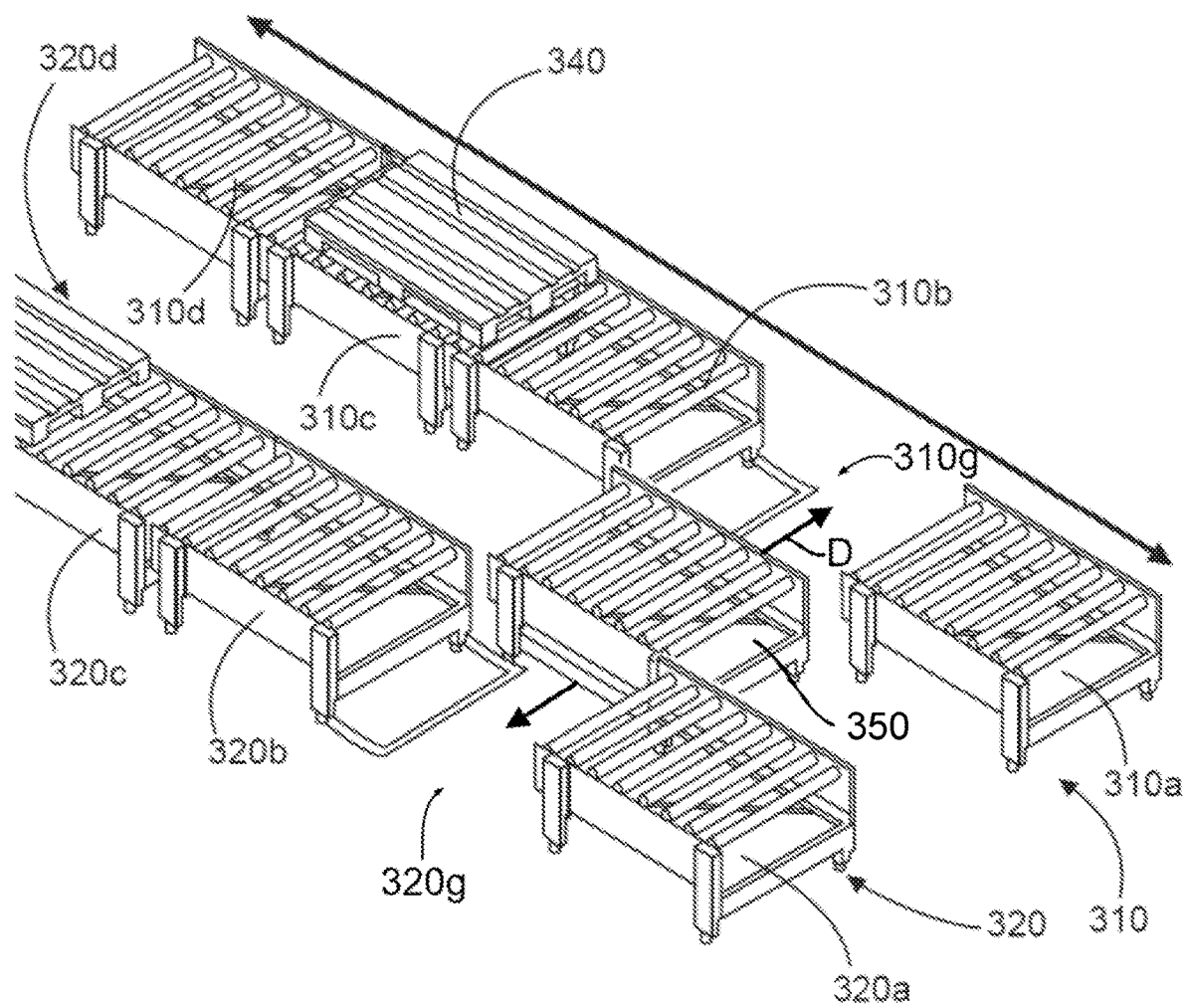
FIG. 5 shows a schematic perspective view of a part of a conveyor device according to the invention.

FIG. 5 shows a schematic setup of a conveyor device. The conveyor device comprises a first conveying track 310 and a second conveying track 320. The conveying tracks 310, 320 are arranged in a parallel arrangement to each other such that pallets 340 or any other objects may be conveyed in a first conveying direction on the first conveyor track 310 and a second conveying direction which is parallel, but in a lateral distance to the first conveying direction on the second conveyor track.

The two conveyor tracks thus are in a lateral distance to each other. Each conveyor track is composed of a plurality of rack elements 310*a-d* and 320*a-d*.

Each conveyor track 310, 320 comprises a movable carrier device formed by a plurality of idle rollers and being capable of carrying a pallet and allowing such pallet to move in the conveying direction along the conveyor tracks, similar to the movable carrier device described in FIG. 1. Underneath this movable carrier device formed by the idle rollers, a free space is present below the idle rollers. In this free space, a robot unit, similar to the unit described in one of FIGS. 1-4 can move along the conveyor track and hereby drive the idle rollers with a driving device. By this, the pallet can be conveyed by the driving force transmitted by such robot unit along the conveyor track.

A cross traverse rack module 350 is arranged for transferring objects like a pallet from the first conveyor track to the second conveyor track and vice versa. The cross traverse rack element 350 comprises a traction device (not shown) which is adapted to move said cross traverse rack element 350 in a traverse direction D with respect to the conveying direction. The cross traverse rack element 350 comprises a movable carrier device 10 as described in FIG. 1, having an upper traverse load surface 11 adapted to take up an object and a traverse coupling interface 12 (not explicitly indicated at the traverse rack element 350, reference is made to the description of the previous figures).

A gap 310g, 320g is present between the rack elements 310a and 310b and between the rack elements 320a and 320b. This gap 310g, 320g is dimensioned such that the cross traverse rack element 350 fits into this gap and fills this gap. If the cross traverse rack element 350 is positioned in any such gap 310g, 320g, the movable carrier device formed by the rack elements and the cross traverse rack element defines an upper continuous load carrying surface allowing an object like a pallet 340 to move over the whole length of the conveyor track.

The cross traverse rack element 350, to this extent, comprises a movable carrier device similar to those of the rack elements and described with respect to FIG. 1. Further, a space below this movable carrier device is present at the cross traverse rack element adapted for taking up a robot unit. The cross traverse rack element 350 may transfer such robot unit simultaneously with a pallet or independently from such pallet from the gap in the first conveyor track to the gap in the second conveyor track and vice versa. By this, pallet and robot unit can be transferred between the two conveyor tracks 310, 320. The cross traverse rack element 350 may comprise a drive unit to drive the lateral movement between the two gaps of the conveyor tracks or may comprise a coupling interface adapted to couple to the traction device or the driving device of the robot unit such that the traction device or the driving device, respectively, may drive the traverse movement of the cross traverse rack element.

FIGS. 6-10 show a sequence of a layout process in a virtual mode on a graphical user interface. As can be seen, a screen of a computer device is used to display a preprogrammed visual layouter for virtually configuring a conveyor device. First, a list of modules, which can be selected by drag & drop by a user is shown in a display field 410. The list contains two entries 410a, b and it is understood that far more modules could be contained in such list.

Figure 6:
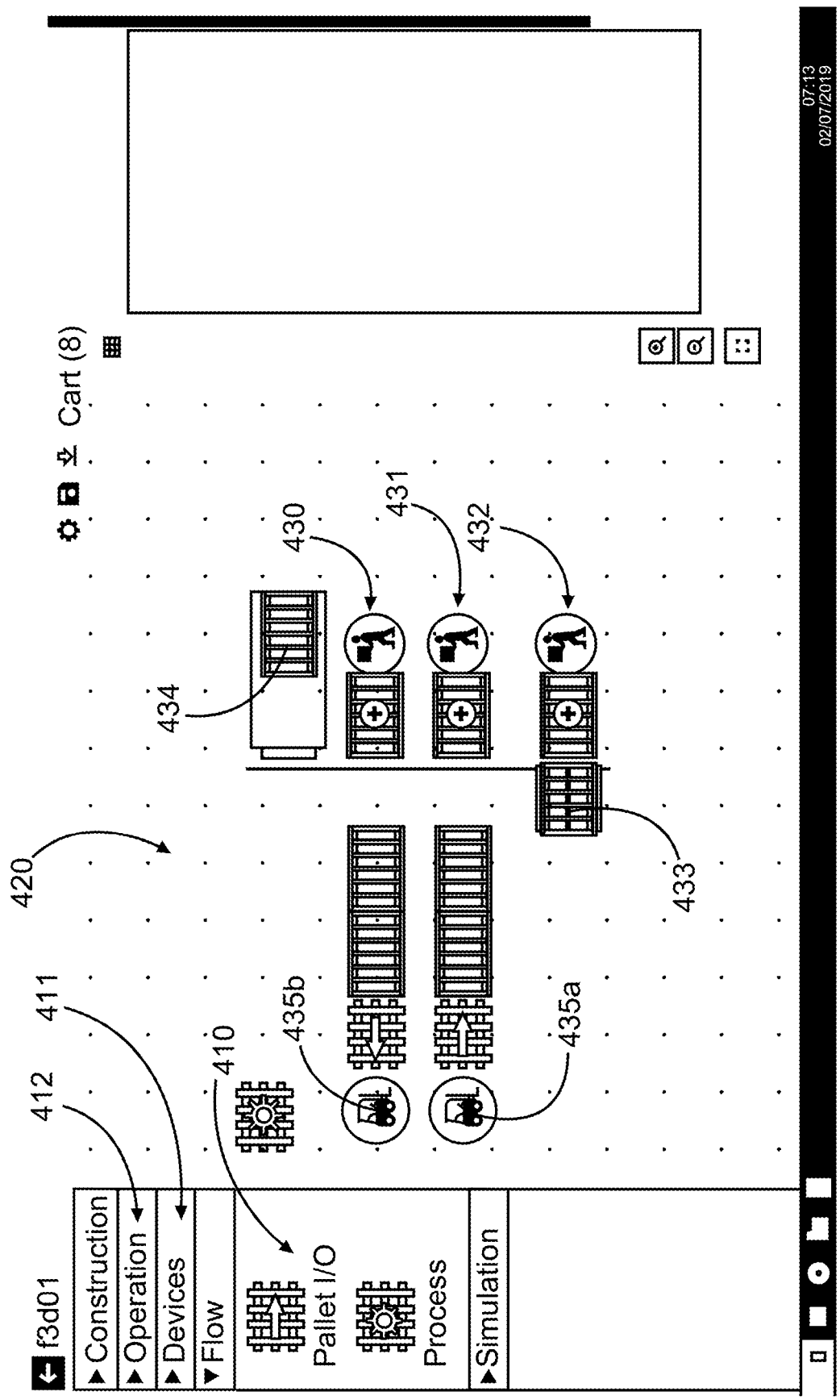
FIG. 6 shows a screenshot of a first step of a layout process.

In the layout step, shown in FIG. 6, a user has selected a module "process" 410c and dragged this module into a layouter field 420 wherein the virtual conveyor device can be layouted.

As can be seen, a part of the conveyor device is already configured in the layouter field. The virtual conveyor device as configured comprises a total of three conveyor tracks 430-432. The two conveyor tracks 430, 431 are composed of a total of four rack modules. A pallet input is defined at the left end of conveyor track 431 and pallet output is defined at the left end of conveyor track 430. Conveyor track 432 is composed of a single rack element. A corridor extending from the third conveyor track 432 into a gap present in conveyor tracks 430, 431 allows a cross traverse rack element 433 to connect the three conveyor tracks 430-432 such that pallets and a robot unit can be transferred between these conveyor tracks.

Further, a pallet dispenser 434 is present in a fourth row of the conveyor device displayed as an arrangement of virtual modules representing the rack elements, the cross traverse rack element and the pallet dispenser. It is understood that the rack elements, the cross traverse rack element and the pallet dispenser can be selected in the list of devices under the menu point "devices" 411.

Still further, operation modules defining a forklift operation 435a, b at the left end of the first and second conveyor track 430, 431 and operation modules defining a human operation at the right end of the conveyor tracks 430-432 are defined in the virtual setup. It is understood that these operation modules can be selected under the menu point "operation" 412 in the list of modules.

Figure 7:
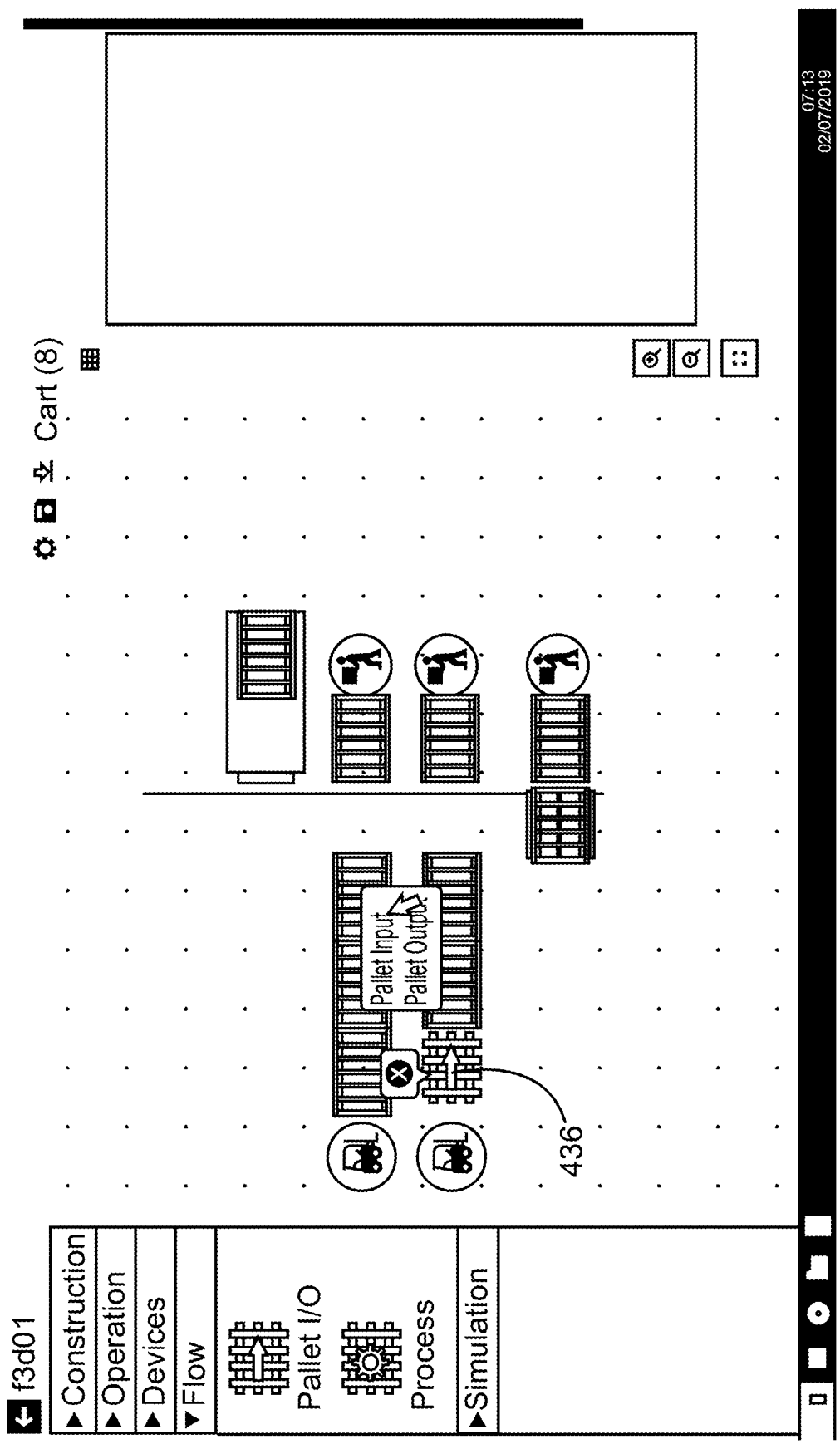
FIG. 7 shows a screenshot of a second step of a layout process.

FIG. 7 shows a layout step, wherein for a pallet I/O module, it can be selected whether this virtual module 436 shall represent a pallet input or a pallet output.

Figure 8:
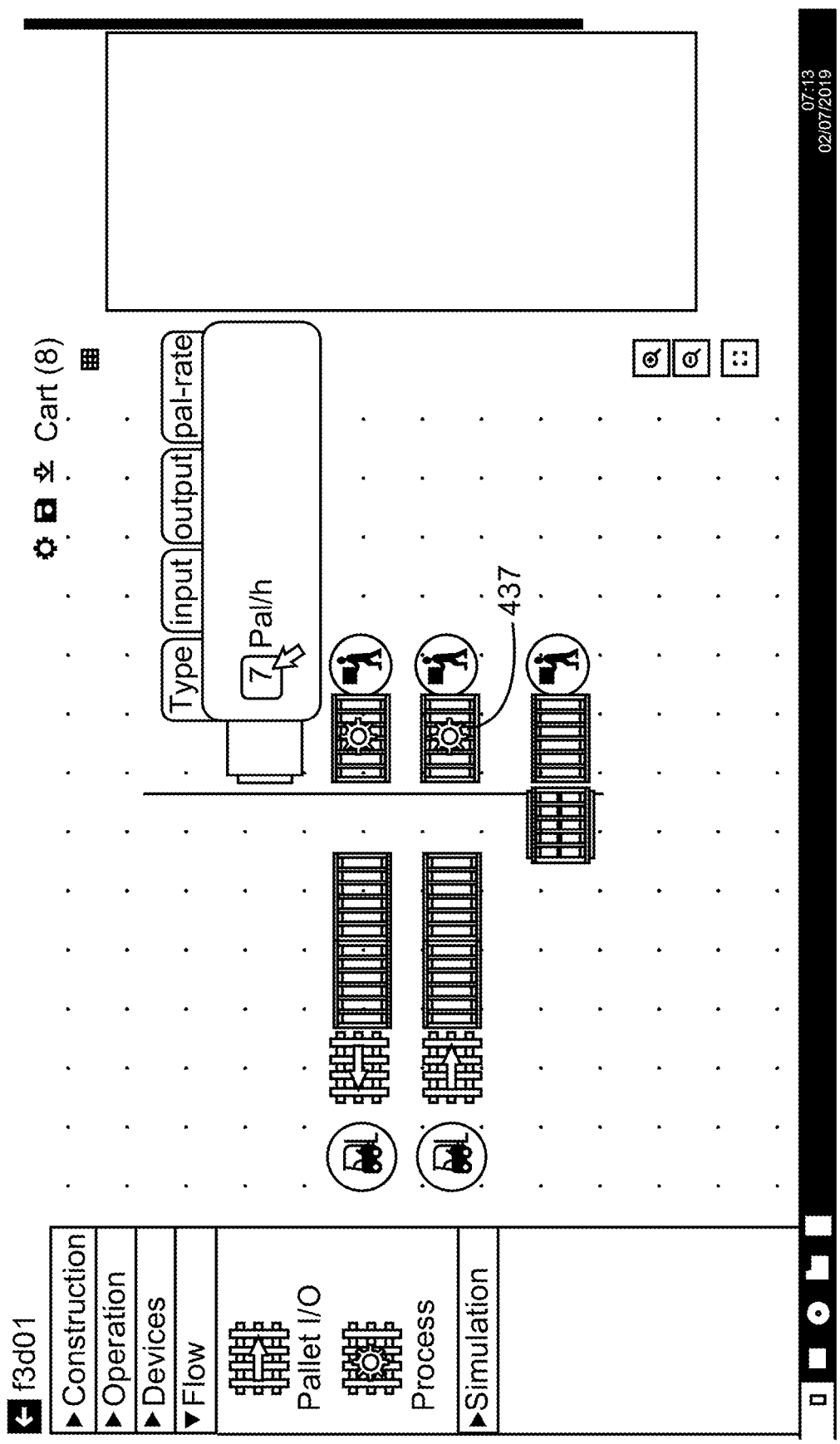
FIG. 8 shows a screenshot of a third step of a layout process.

FIG. 8 shows a virtual layout step, wherein for a human operation 437, at the right end of the conveyor track 430, a capacity is defined. In this virtual layout step, a capacity of 7 pallets per hour is defined to be the maximum capacity provided at this module.

Figure 9:
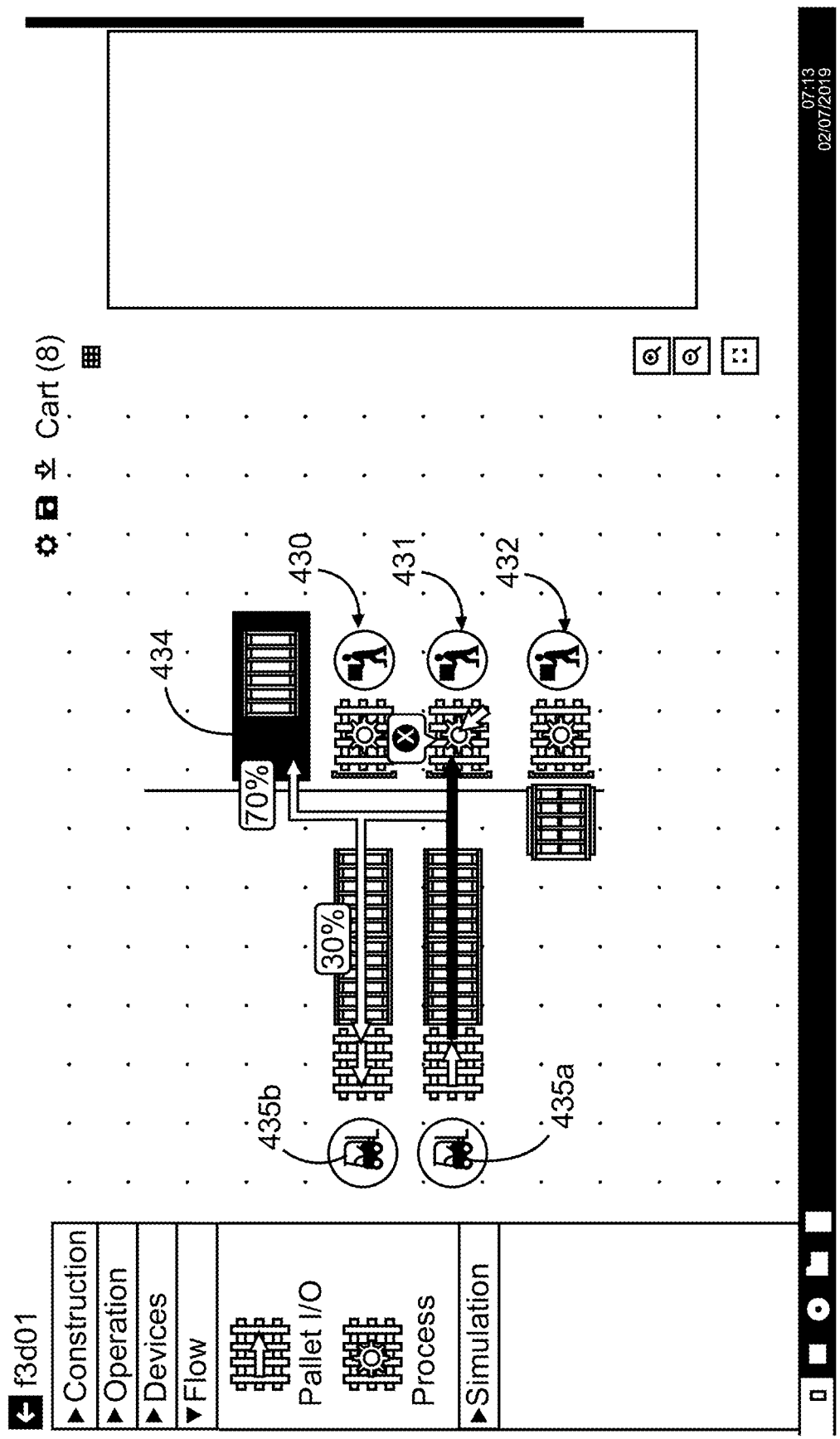
FIG. 9 shows a screenshot of a fourth step of a layout process.

In FIG. 9, a virtual layout step is shown wherein a ratio of a pallet flow is defined. This ratio defines that the pallets, input via the operation of the forklift 435a at the left end of conveyor track 431, shall all be transported to the human operating module at the right end of the second conveyor track 431. Further, after having undergone the human operation at this module, 30% of the pallets shall be output via the pallet output at the left end of the first conveyor track 430 and 70% of the pallets shall be conveyed to the pallet dispenser 434.

Figure 10:
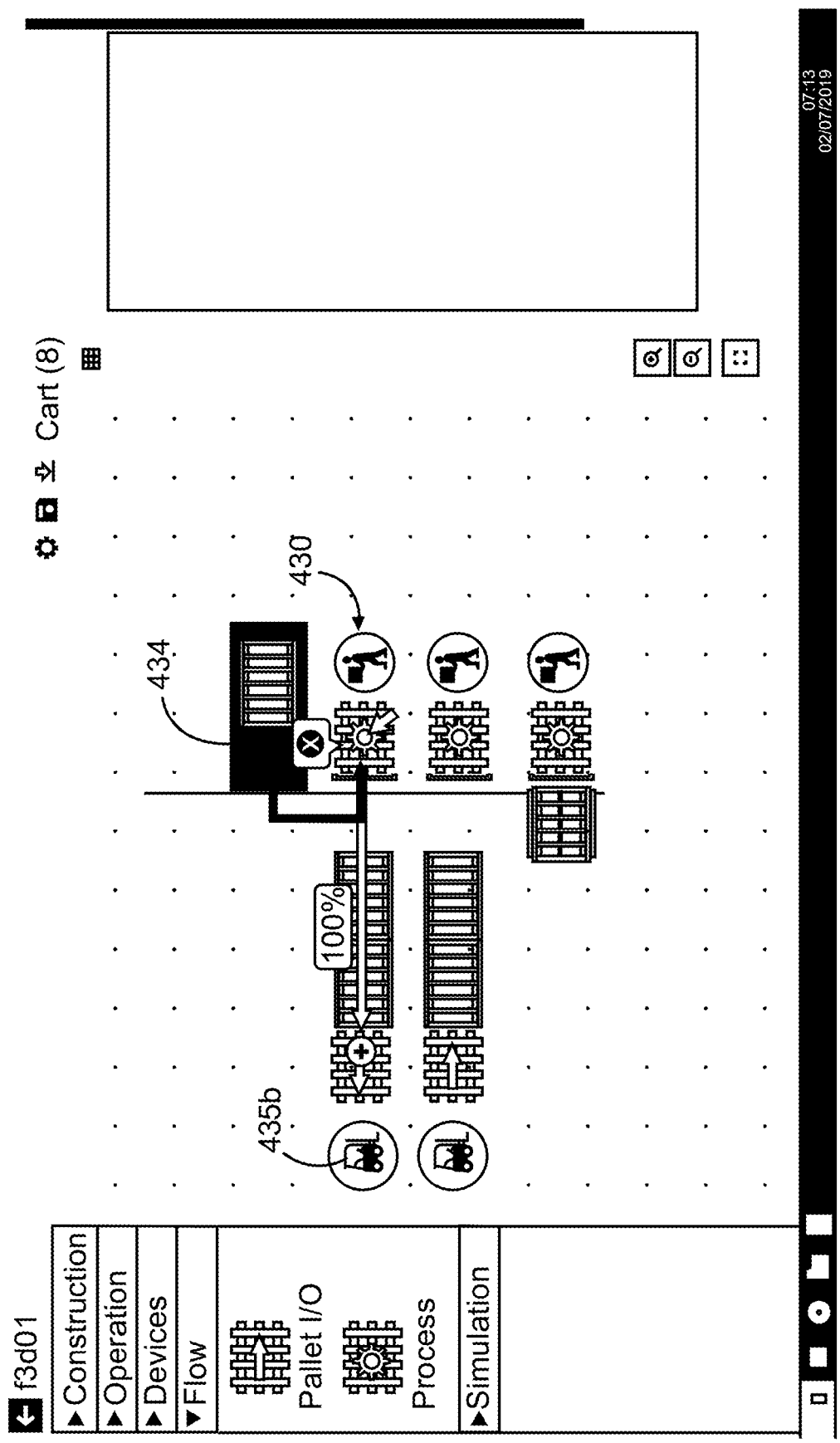
FIG. 10 shows a screenshot of a fifth step of a layout process.

FIG. 10 shows a further virtual layout step, wherein it is defined that those pallets dispensed from the pallet dispenser 434 to the human operating module at the right end of the first conveyor track 430 shall be conveyed by 100% to the pallet output at the left end of the first conveyor track 430 to be expelled to the forklift 435b.

Figure 11:
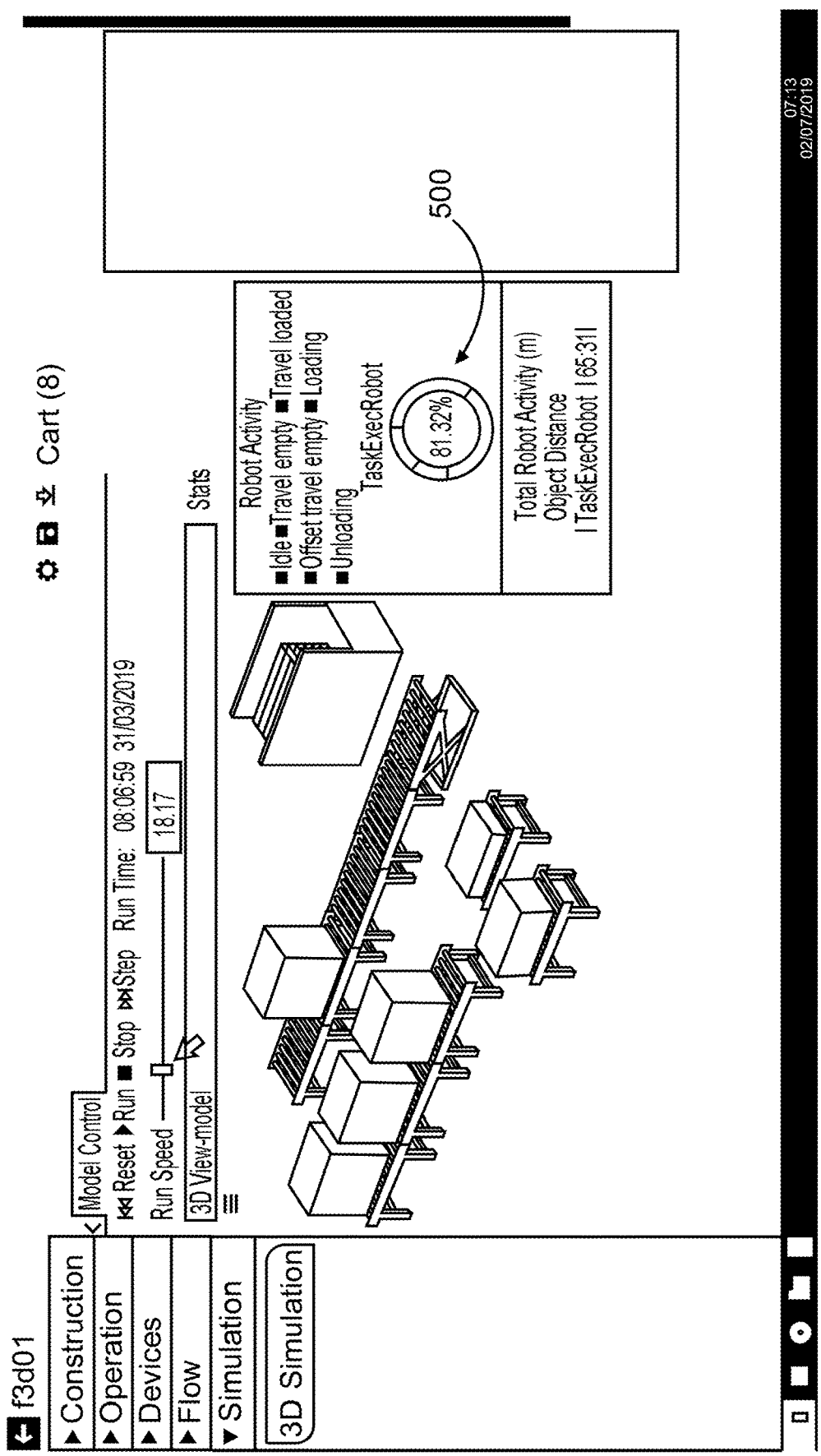
FIG. 11 shows a screenshot of a signal output after a simulation of a conveying action.

Turning further to FIG. 11, a schematic perspective view of the conveyor device is shown in the graphical user interface. This view is displayed in a three-dimensional simulation of the conveying processes conducted in said conveyor device. The conveying processes are displayed in a sequence such that a simulated virtual video of the conveying processes is displayed to the user. The user may identify collisions or bottlenecks or inefficient travel paths of the robot unit or objects conveyed in the conveying processes by analyzing such video simulation of the conveying processes. Further, insufficient capacities of input or output devices or of conveyor modules inside the simulated conveyor device may be identified.

As can be seen, a signal 500 is output to the user as a result of a full cycle of the conveying processes. In this signal 500, the activities of the robot unit are specified and classified in quality and quantity. It is given out the rate of idle action of the robot unit, the rate of empty travel action, the rate of loaded travel action, the rate of empty cross traverse travel action of the robot unit and the rate of loading and the rate of unloading action of the robot unit. Using this display of all robot actions or at least two of these robot actions enables the user to optimize the programming of travel paths of the robot unit or of the setup of the conveyor device or to add further capacities to the conveyor device to eliminate bottlenecks.

Figure 12:
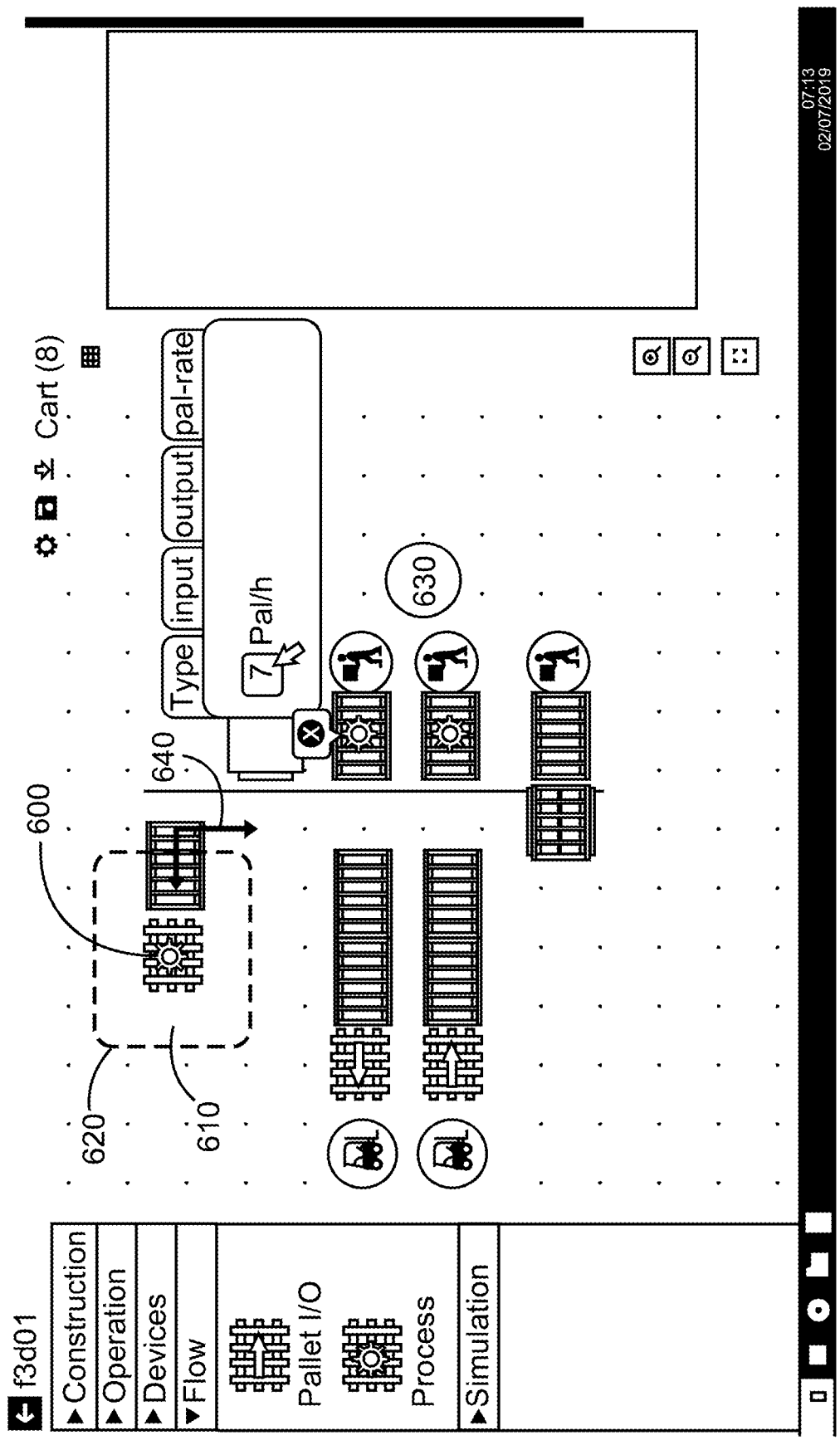
FIG. 12 shows a screenshot of a conveyor setup including a tool machine.

FIG. 12 shows a layout of a conveyor device comprising a tool machine 600. The tool machine 600 serves to machine objects conveyed by the conveyor device to the tool machine and away from the tool machine. The tool machine is characterized by a certain capacity as a tool machine parameter, which is considered in the simulation of the capacity shown in FIG. 11, if such simulation is performed on the layout depicted in FIG. 12.

The tool machine is surrounded by a safeguarded area 610. A fence 620 delimiting this safeguarded area 610 from the human working space 630 defines the border between the human working space 630 and the safeguarded space 610. The fence 620 shall physically hinder a human being to enter into the safeguarded area 610 in the real conveyor device and is virtually depicted by a broken line surrounding said safeguarded region.

As can be seen, the robot unit may exit out of the human working space 630 into the safeguarded region 610 on a conveying path 640 and leave the safeguarded region via this conveying path 640. A conveying parameter may be assigned to the safeguarded region 610 or the fence 620 containing information about a travel speed of the robot unit inside the safeguarded region 610, which may be different from a travel speed outside the safeguarded region in the human working space. This different travel speed may be considered in the virtual simulation of the conveying processes of the conveyor device represented by the virtual layout representing the virtual conveyor device.

LIST OF REFERENCE NUMERALS 10 movable carrier device
10a,b,c roller
11 load carrying surface
12 coupling interface
20 robot unit
21 traction device
30 driving device
31 upper belt plane
40 object
120 robot unit
120a, b front, rear end
122a, b time-of-flight-sensor
123a, b sensor range sector
140 pallet
222a-e time-of-flight-sensor
310 first conveying track
310a-d rack element
310g gap
320 second conveying track
320a-d rack element
320g gap
340 pallet
350 cross traverse rack module
4111 menu point "devices"
412 menu point "operation"
430-432 conveyor track
433 traverse rack element
434 pallet dispenser
435a, b forklift
436 virtual module
437 human operation
500 signal
600 tool machine
610 safeguarded area
620 fence
630 human working space
640 conveying path of robot unit

The invention claimed is:

1. A conveyor device, comprising
a) a plurality of rack elements (310a-d) arranged in a first row to define a first conveyor track (310a-d), wherein said first conveyor track (310) is adapted to guide and carry an object (40, 140, 340) along a first conveying direction
b) a plurality of rack elements (320a-d) arranged in a second row to define a second conveyor track (320),
wherein said second conveyor track (320) is adapted to guide and carry an object (40, 140, 340) along a second conveying direction,
wherein said second conveyor track (320) extends in said second conveying direction and is positioned in a lateral distance to said first conveyor track (310) with respect to said second conveying direction,
wherein each rack element comprises a movable carrier device having an upper load surface (11) and a coupling interface (12),
c) a robot unit (20) with a traction device (21) and a driving device (30), wherein said traction device (21) is adapted to move said robot (20) unit along said first or said second conveying direction and said driving device (30) is adapted to engage said coupling interface (12) of said movable carrier device (10) to drive said movable carrier device (10),
d) a cross traverse rack element (350) adapted to take up said robot unit (20), wherein said cross traverse rack element (350) comprises a traverse movable load carrying device (10) having an upper traverse load surface (11) adapted to take up an object and a traverse coupling interface (12),
wherein said cross traverse rack element (350) is adapted to move in a lateral direction with respect to said second conveying direction from said first conveyor track (310) to said second conveyor track (320) and vice versa,
wherein said cross traverse rack element (350) is further adapted to couple to said first conveyor track (310) and to transfer an object (40) positioned on said traverse load surface (11) to said load surface (10) of said movable carrier device (10) of a rack element (310a-d) of said first conveyor track (310) and vice versa in a first position of said cross traverse rack element (350),
wherein in said first position said cross traverse rack element (350) is coupled to said rack element (310a-d) of said first conveyor track (310) such that said robot unit (20) may move from said cross traverse rack element (350) to said rack element (310a-d) of said first conveyor track (310) and vice versa,
wherein said cross traverse rack element (350) is further adapted to couple to said second conveyor track (320) and to transfer an object positioned on said traverse load surface (11) to said load surface (11) of said movable carrier device (10) of a rack element (320a-c)

of said second conveyor track (320) and vice versa in a second position of said cross traverse rack element (350),
wherein in said second position said cross traverse element (350) is coupled to said rack element (320a-c) of said second conveyor track (320) such that said robot unit (20) may move from said cross traverse rack element (350) to said rack element (320a-c) of said second conveyor track (320) and vice versa.

2. A conveyor device according to claim 1, wherein
said cross traverse rack element (350) is adapted to be coupled to said robot unit (20) such that said traction device (21) of said robot unit effects said lateral movement of said cross traverse rack element (350), or
said cross traverse rack element (350) comprises a traverse traction device with a traverse traction coupling interface adapted to couple to said traction device (21) or said driving device (30) of said robot unit (20) when said robot (20) unit taken up by said cross traverse rack element (350) such that a driving force transmitted via said traverse traction coupling interface from said robot unit (20) to said traverse traction device drives the lateral movement of the cross traverse rack element (350) with said robot unit taken up.

3. A conveyor device according to claim 1, wherein said traverse coupling interface (12) is adapted to couple to said driving device (30) of said robot unit (20) and wherein a force transferred via said traverse coupling interface (12) from said driving device to said traverse movable carrier device conveys an object (40) positioned on said traverse load carrying surface (11).

4. A conveyor device according to claim 1, wherein said movable carrier device (10) and/or said traverse movable carrier device (10) comprises a plurality of idle rollers (10a,b,c),
wherein a first surface section, in particular a top circumferential surface section or a first axial circumferential surface of the idle rollers define the load carrying surface (11) and the traverse load carrying surface (11), respectively,
wherein a second surface section, in particular a bottom circumferential surface section or a second axial circumferential surface section of the idle rollers define the coupling interface (12) and the traverse coupling interface (12), respectively.

5. A conveyor device according to claim 1, wherein at least one of the first and the second conveyor track (310, 320) comprises a coupling end or a gap (310g, 320g) between two rack elements forming said first and second conveyor track, respectively, said gap being dimensioned to take up said cross traverse rack element (350) in said first and said second position, respectively.

6. The conveyor arrangement of claim 1,
wherein said robot unit has a front end and a rear end, with at least one front time-of-flight sensor being positioned at said front end and preferably at least one rear time-of-flight sensor being positioned at said rear end,
further comprising a control unit coupled to said front time-of-flight sensor for receiving a sensor signal with said control unit being adapted to interpret said sensor signal to identify an obstacle in the conveying direction and to control said traction device to stop if an obstacle is identified in a driving mode.

7. The conveyor arrangement of claim 6,
wherein said control unit is adapted to interpret said sensor signal to identify an object on top of said movable carrier device and to control said traction device to position said robot unit below said object.

8. A conveyor arrangement, comprising
a plurality of rack elements (310a-d, 320a-c) extending along a conveying direction, each of said rack elements comprising a movable load carrying surface (11) defined by a movable carrier (10) device,
a second conveyor module configured as a robot unit (20),
wherein said robot unit (20) comprises
a traction device (21) for driving said drive robot unit (20) along said rack element in said conveying direction, and
a driving device (30) adapted to couple with said movable carrier (10) device and to drive said movable carrier device (10), wherein said coupling of said driving device (30) to said movable carrier device (10) enables said driving device (30) to move said movable load carrying surface (11),
at least one tool machine (600) representing a first station capable to input objects into the conveyor device,
a fence (620) circumscribing a safeguarded zone (610) wherein said tool machine (620) is positioned within said safeguarded zone (610),
further comprising a human work zone (630) adjacent to said safeguarded zone (610) and separated from said safeguarded zone (610) by said fence (620),
wherein said rack elements define a conveying track extending from said human work zone through said fence into said safeguarded zone,
wherein said robot unit (20) is adapted to drive in said rack elements from said human work zone into said safeguarded zone and vice versa.

9. A method of handling an object and machining said object in a tool machine, comprising the steps of
Conveying said object along a plurality of rack elements extending along a conveying direction, said rack elements extending from saida human work zone into a tool machine zone separated from said human work zone by a fence,
each of said rack elements comprising a movable load carrying surface defined by a movable carrier device,
wherein a robot unit comprising a traction device and a driving device is driven by said traction device along said rack element and
wherein said driving device couples with said movable carrier device and drives said movable carrier device,
wherein said object is positioned on top of said movable carrier device,
wherein said object is handled by a human in said human work zone by a human, and is moved along said rack elements on top of said movable carrier device synchronously with said robot unit with said driving device being coupled to said movable carrier device from said human work zone into said tool machine zone for machining said object by said tool machine, or
wherein said object is machined by said tool machine in said tool machine zone and is moved along said rack elements on top of said movable carrier device synchronously with said robot unit with said driving device being coupled to said movable carrier device from said tool machine zone into said human work zone and handled by a human in said human work zone.

10. The method of claim 9, comprising the steps of
conveying said object along a plurality of rack elements extending along a conveying direction of a first conveyor track by said robot unit with said driving device being coupled to said movable carrier device,
transporting said robot unit and said object by a cross traverse rack element to a second conveyor track,
conveying said object along a plurality of rack elements extending along a conveying direction of said second conveyor track by said robot unit with said driving device being coupled to said movable carrier device.

* * * * *